US011123766B2

United States Patent
Smith et al.

(10) Patent No.: US 11,123,766 B2
(45) Date of Patent: Sep. 21, 2021

(54) CAPACITIVE DISCHARGE PUSH-PULL CONVERTER PULSER FOR ELECTROMAGNETIC ACOUSTIC TRANSDUCER

(71) Applicant: Innerspec Technologies, Inc., Forest, VA (US)

(72) Inventors: Stephen William Smith, Appomattox, VA (US); Philip Haywood Cox, Madison Heights, VA (US)

(73) Assignee: INNERSPEC TECHNOLOGIES, INC, Forest, VA (US)

(*) Notice: Subject to any disclaimer, the term of this patent is extended or adjusted under 35 U.S.C. 154(b) by 251 days.

(21) Appl. No.: 16/415,701

(22) Filed: May 17, 2019

(65) Prior Publication Data

US 2020/0360966 A1    Nov. 19, 2020

(51) Int. Cl.
*B06B 1/02* (2006.01)
*B06B 1/04* (2006.01)
*H02M 7/538* (2007.01)
*G01N 29/24* (2006.01)

(52) U.S. Cl.
CPC ............ *B06B 1/0215* (2013.01); *B06B 1/045* (2013.01); *G01N 29/2412* (2013.01); *H02M 7/538* (2013.01)

(58) Field of Classification Search
CPC ... H02M 7/538; G01N 29/2412; B06B 1/045; B06B 1/0215

USPC .......................................................... 367/140
See application file for complete search history.

(56) References Cited

U.S. PATENT DOCUMENTS

| 5,526,213 A | 6/1996 | MacLauchlan et al. |
| 5,721,379 A | 2/1998 | Palmer et al. |
| 6,125,703 A | 10/2000 | Mac Lauchlan et al. |
| 6,250,163 B1 | 6/2001 | MacLauchlan et al. |
| 8,509,031 B2 | 8/2013 | Smith |
| 2009/0102443 A1* | 4/2009 | Smith ................... B06B 1/0269 323/282 |
| 2018/0369864 A1 | 12/2018 | Lei |

FOREIGN PATENT DOCUMENTS

CA              2142429 C        6/1998

* cited by examiner

*Primary Examiner* — Daniel L Murphy

(57) ABSTRACT

A high-voltage pulser circuit for Electromagnetic Acoustic Transducer (EMAT) coils using a Capacitive Discharge push-pull converter. The present invention relates in particular to the operation of the converter into an Electromagnetic Acoustic Transducer (EMAT) differential coil. The present invention reduces ringing of the coil current resulting in a smaller blind zone and a well-defined broadband ultrasonic wave from the coil. The pulser can be used to generate one or more cycles and work in either pulse-echo (same transmitter and receiver) or pitch-catch (different transmitter and receiver).

15 Claims, 2 Drawing Sheets

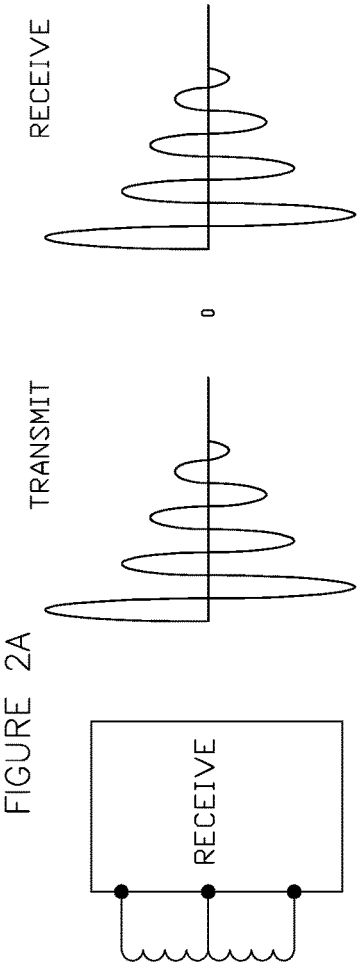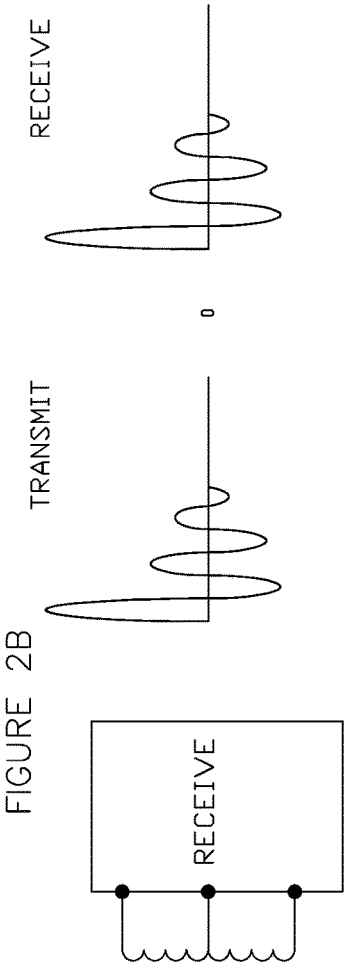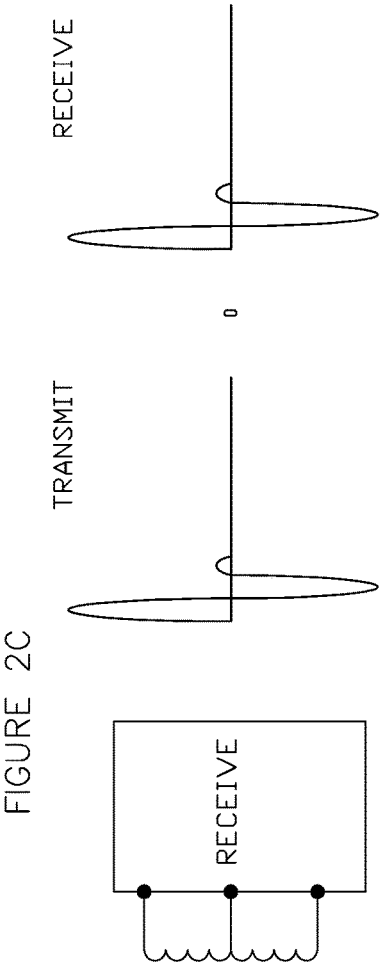

CAPACITIVE DISCHARGE PUSH-PULL CONVERTER PULSER FOR ELECTROMAGNETIC ACOUSTIC TRANSDUCER

BACKGROUND OF THE INVENTION

The present invention relates generally to the field of non-destructive testing and in particular to the pulsing of an Electromagnetic Acoustic Transducer (EMAT) coil.

Electromagnetic Acoustic Transducer pulsers have until now used four standard power supply topologies: Capacitive Discharge; H-Bridge; Half-Bridge; and Push-Pull. Each one has its own advantages and limitations.

Low-power Electromagnetic Acoustic Transducer (EMAT) instruments typically employ standard capacitive discharge topologies to achieve the conversion of a primary dc voltage to a high ac current by "ringing" the EMAT coil for one half cycle. The dc input voltage is discharged into the EMAT coil which then rises and falls for half a cycle creating an offset ac current by a single switching device (transistor, Metal Oxide Silicon Field Effect Transistor (MOSFET), insulated gate bipolar transistor or thyristor). This ac voltage is then converted to an ultrasonic wave by the interaction of the EMAT coil with a magnetic field. The advantage of this topology is the reduced size and complexity. The most important disadvantage is that it only permits ringing the EMAT coil with half a cycle which limits the amount of current that can be introduced to the EMAT coil, and the strength of the ultrasonic signals.

H-Bridge topology, as described in U.S. Pat. No. 8,509,031 B2, Half-Bridge, and Push-Pull all share similar advantages and limitations. With different constructions, all these topologies permit introducing into the EMAT coil very high voltages and current in a wide range of frequencies with one or many full cycles, so they are widely used for generation of ultrasound with EMAT. All these circuits, however, have not shown to correct, in a "passive manner", the natural ringing of the coil responsible for the blind zone of the transducer (initial ringing). These also do not produce the single-cycle broadband response of the capacitive discharge topology. An additional disadvantage of these designs is the complexity of the drivers, and, in the case of the H-Bridge and Push-Pull, the need for a transformer to increase power output that adds weight, size, and increases ringing.

Attempts to control the ringing coil current in the EMAT coil on these above mentioned topologies using passive and active circuits, have so far proven ineffective in the removal of the undesirable ringing.

As can be seen, there is a need for an EMAT coil pulser topology that is small in size, has reduced complexity, is highly efficient, reduces undesired ringing, and can produce one or more high-voltage and high-current full cycles for different EMAT applications.

SUMMARY OF THE INVENTION

In one aspect of the present invention, a circuit for pulsing electromagnetic acoustic transducer differential coils using a capacitive discharge push-pull converter comprises: a first electrical circuit electrically connected to a DC voltage source, and comprising a first capacitor, wherein voltage from the DC voltage source charges the first capacitor; a second electrical circuit electrically connected to the DC voltage source, and comprising a second capacitor, wherein voltage from the DC voltage source charges the second capacitor; a differential electrical coil electrically coupled to the first electrical circuit and the second electrical circuit; a first low voltage driver providing a square pulse with duration coinciding with the first half of one full cycle at the desired frequency to a first transistor, wherein the first transistor discharges the first capacitor so that a current passes through a first half of the differential electrical coil; and a second low voltage driver providing a square pulse with duration coinciding with the second half of one full cycle at the desired frequency to a second transistor, wherein the second transistor discharges the second capacitor so that a current passes through a second half of the differential electrical coil These and other features, aspects and advantages of the present invention will become better understood with reference to the following drawings, description and claims.

BRIEF DESCRIPTION OF THE DRAWINGS

FIG. 2A-2C illustrates the typical transmit and receive signals on an Electromagnetic Acoustic Transducer (EMAT) differential coil when excited with different power supply topologies, including the Capacitive Discharge Push-Pull Converter of the present invention.

DETAILED DESCRIPTION OF THE INVENTION

Figure 1:
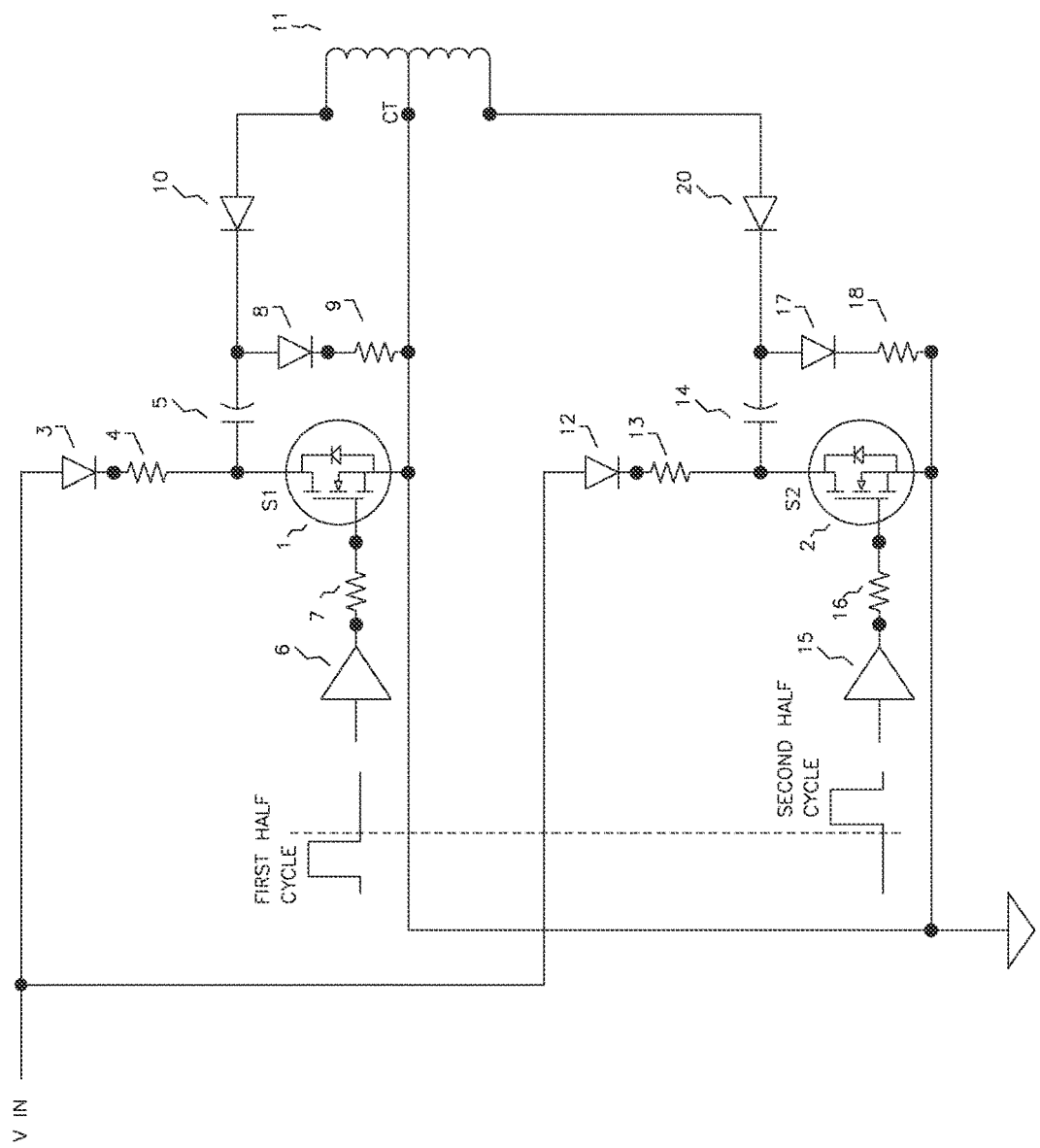
FIG. 1 is a schematic view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention relates to a Capacitive Discharge push-pull converter circuit used for driving differential Electromagnetic Acoustic Transducer (EMAT) coils used in ultrasonic testing. The present invention is used to prevent undamped ringing in the EMAT differential electrical coil without the use of costly and complex high power switching devices and control circuits, while pulsing with a single or multiple full cycles of high voltage and current. One embodiment of the present invention shows the ability of this pulser topology to work in Pulse-Echo configuration in which the differential electrical coil used for transmission is also used for reception of the ultrasonic signal, and in Pitch-Catch configuration in which the transmitter differential electrical coil is different from the receiver differential electrical coil. The present invention is able to work at high frequencies, in excess of 10 MHz, with superior performance to other pulser topologies.

FIG. 1 illustrates a capacitive discharge push-pull converter for pulsing differential Electromagnetic Acoustic Transducer (EMAT) differential electrical coils 11 which is driven by a high voltage dc source voltage connected to Vin and common ground. The voltage is applied to a first diode 3 and a second diode 12. The current flows in one direction through a first resistor 4, a first capacitor 5, a third diode 8, and a second resistor 9, which charges the first capacitor 5 to Vin voltage. The current also flows in one direction through a third resistor 13, second capacitor 14, a fourth diode 17, and a fourth resistor 18, which charges the second capacitor 14 to Vin voltage at the same moment. A fifth diode 10 and a sixth diode 20 block positive voltage to the differential electrical coil 11.

A first square pulse with a duration coinciding with a duration coinciding with the second half of one full cycle at the desired frequency is applied to a first driver 6. The first drive 6 sends voltage, current limited by a fifth resistor 7, to a first MOSFET 1 (S1). The first MOSFET 1 (S1) turns on and discharges the first capacitor 5 through the fifth diode 10. The voltage is negative on the third diode 8 anode which blocks voltage, but the negative voltage passes through the fifth diode 10 cathode to the differential electrical coil 11. This results in the current flowing through the differential electrical coil 11 until the first driver 6 is turned off, completing the first half of the cycle.

A second square pulse equal to one half the output frequency desired is applied to a second driver 15. The second driver 15 sends voltage, current limited by a sixth resistor 16, to a second MOSFET 2 (S2). The second MOSFET 2 (S2) turns on, and discharges capacitor 14 through diode 20. The voltage is negative on the third diode 8 anode which blocks voltage, but the negative voltage passes through the sixth diode 20 cathode to the differential electrical coil 11. This result in the current flowing through the differential electrical coil 11 until the second driver 15 is turned off completing the second half of the cycle.

After a full cycle is completed, the coil current collapses in the differential electrical coil 11. A reverse positive voltage is directed back to the fifth diode 10 and the sixth diode 20. The fifth and sixth diodes 10, 20 conduct and pass the voltage to the third and fourth diodes 8, 17. The third and fourth diodes 8, 17 now conduct and pass voltage to the second and fourth resistors 9, 18 which dissipate the energy, clamping the voltage to about 1.5 volts. This removes the ringing at the differential electrical coil 11. By altering the value of capacitors, the number of cycles can vary from 1 to 15.

FIG. 2 is a representation of all of the different topologies used to drive a differential Electromagnetic Acoustic Transducer (EMAT) coil 11. Prior topologies allow increased ringing from the lack of a ring down clamp circuit. Additionally, topologies that utilize a transformer increase the ringing further because of the parasitic inductive properties present in the transformer. FIG. 2A represents the push-pull, half-bridge and full-bridge pulser designs that have similar output characteristics. FIG. 2B represents a basic capacitive discharge pulser which provides a half cycle discharge in which a ring-down damping circuit would not work for it needs to ring to provide an oscillatory behavior to create a full cycle. FIG. 2C shows the output signal when using the EMAT pulser of the present invention which provides a clean ultrasonic signal and no ringing.

It should be understood, of course, that the foregoing relates to exemplary embodiments of the invention and that modifications may be made without departing from the spirit and scope of the invention as set forth in the following claims.

What is claimed is:

1. A circuit for pulsing electromagnetic acoustic transducer coils using a capacitive discharge push-pull converter comprising:
    a first electrical circuit electrically connected to a DC voltage source, and comprising a first capacitor, wherein voltage from the DC voltage source charges the first capacitor;
    a second electrical circuit electrically connected to the DC voltage source, and comprising a second capacitor, wherein voltage from the DC voltage source charges the second capacitor;
    a differential electrical coil electrically coupled between an output of each of the first electrical circuit and the second electrical circuit;
    the first electrical circuit configured for connection to a first driver providing a first square pulse with a duration coinciding with a first half of one full cycle at a desired frequency to a first transistor in the first electrical circuit, wherein the first transistor discharges the first capacitor so that a current passes through the differential electrical coil during the first half of one full cycle at the desired frequency; and
    the second electrical circuit configured for connection to a second driver providing a second square pulse with a duration coinciding with a second half of the one full cycle at the desired frequency to a second transistor in the second electrical circuit, wherein the second transistor discharges the second capacitor so that a current passes through the differential electrical coil during the second half of the one full cycle at the desired frequency.

2. The circuit of claim 1, wherein the first electrical circuit further comprises a first diode and a first resistor, wherein a current from the DC voltage source runs through the first diode and the first resistor, and charges the first capacitor.

3. The circuit of claim 2, wherein the first electrical circuit further comprises a third diode, a second resistor, and a fourth diode, wherein the third diode and the second resistor receives a positive voltage while the first capacitor charges and the third diode blocks the differential electrical coil from the positive voltage.

4. The circuit of claim 1, wherein the second electrical circuit further comprises a second diode and a third resistor, wherein a current from the DC voltage source runs through the second diode and the third resistor, and charges the second capacitor.

5. The circuit of claim 4, wherein the second electrical circuit further comprises a fourth diode, a fourth resistor, and a sixth diode, wherein the fourth diode and the fourth resistor receives a positive voltage while the second capacitor charges and the sixth diode blocks the differential electrical coil from the positive voltage.

6. The circuit of claim 1, wherein the voltage from the first driver passes through a fifth resistor to the first transistor.

7. The circuit of claim 1, wherein the voltage from the second driver passes through a sixth resistor to the second transistor.

8. The circuit of claim 1, wherein the first electrical circuit and the second electrical circuit receive the voltage from the DC voltage source simultaneously.

9. The circuit of claim 1, wherein the first driver and the second driver alternate between being powered for a full cycle.

10. The circuit of claim 9, wherein after a full cycle is complete, current collapses in the differential electrical coil, and a reverse positive voltage is directed to dissipate the energy, clamping the voltage to about 1.5 volts.

11. The circuit of claim 1, wherein the first transistor is a first Metal Oxide Silicon Field Effect Transistor (MOSFET) and the second transistor is a second MOSFET.

12. The circuit of claim 1, wherein a reduced ringing in the differential electrical coil provides a blind zone in an ultrasonic signal as small as 1 μs at 8 MHz.

13. The circuit of claim 1, wherein the differential electrical coil is pulsed at frequencies in excess of 10 MHZ.

14. The circuit of claim 1, wherein the differential electrical coil is used for transmission and reception.

15. The circuit of claim 1, wherein the differential electrical coil comprises a first electrical coil used for transmission and a second electrical coil used for reception.

\* \* \* \* \*